United States Patent
Wang et al.

(10) Patent No.: US 8,855,670 B2
(45) Date of Patent: Oct. 7, 2014

(54) DYNAMIC RECONFIGURATION OF REGULATION-COMPLIANCE MODE IN COGNITIVE RADIO NETWORKS

(75) Inventors: Jianfeng Wang, Ossining, NY (US); Kiran S. Challapali, New City, NY (US)

(73) Assignee: Koninklijke Philips N.V., Eindhoven (NL)

( * ) Notice: Subject to any disclaimer, the term of this patent is extended or adjusted under 35 U.S.C. 154(b) by 151 days.

(21) Appl. No.: 13/388,534

(22) PCT Filed: Jul. 12, 2010

(86) PCT No.: PCT/IB2010/053184
§ 371 (c)(1),
(2), (4) Date: Feb. 2, 2012

(87) PCT Pub. No.: WO2011/015960
PCT Pub. Date: Feb. 10, 2011

(65) Prior Publication Data
US 2012/0129467 A1 May 24, 2012

Related U.S. Application Data

(60) Provisional application No. 61/231,388, filed on Aug. 5, 2009.

(51) Int. Cl.
*H04W 24/00* (2009.01)
*H04W 16/14* (2009.01)
*H04W 72/02* (2009.01)
*H04W 24/02* (2009.01)

(52) U.S. Cl.
CPC .............. *H04W 16/14* (2013.01); *H04W 72/02* (2013.01); *H04W 24/02* (2013.01)
USPC ..................................................... 455/456.1

(58) Field of Classification Search
CPC ...... H04W 24/08; H04W 16/18; H04W 16/14
USPC ................ 455/67.14, 67.11, 414.2, 410, 411, 455/456.1, 404.2, 440
See application file for complete search history.

(56) References Cited

U.S. PATENT DOCUMENTS

2009/0061779 A1   3/2009   Gurney
2009/0124208 A1   5/2009   Mody

FOREIGN PATENT DOCUMENTS

EP    1168878 A2    1/2002
WO    WO2004036846 A2   4/2004
WO    WO2009018300 A1   2/2009

OTHER PUBLICATIONS

Stevenson C et al., "IEEE 802.22: The IEEE 802.22: The First Cognitive Radio Wireless Regional Area Network Standard", IEEE Communications Magazine, IEEE Service Center, Piscataway, US, vol. 44, No. 1, Jan. 1, 2009, pp. 130-138.
Shellhammer S.J. et al., "Technical Challenges for Cognitive Radio in the TV White Space Spectrum", IEEE, Information Theory and Applications Workshop, San Diego, CA, Feb. 2009, pp. 323-333.

*Primary Examiner* — Eugene Yun
(74) *Attorney, Agent, or Firm* — Larry Liberchuk

(57) ABSTRACT

A method for dynamically reconfiguring a regulation-compliance mode of a device, belonging to a wireless network and operating under a network-operation mode (311, 321, 322) in a spectrum band with primary users. The method includes periodically determining at least one of: a primary protection capability of the device (501, 502, 704, 705), availability of enabling signal to the device (601, 701), and a frequency of location change of the device (508, 510, 711, 712); and based on the results of such determinations, operating and configuring transmission parameters of the device according to one of a plurality of regulation-compliance modes that are supported by the device. The wireless device includes: a signal transceiver (201) for processing, transmitting and receiving wireless signals from secondary devices; a primary signal sensing module (202) for detecting a primary signal; a spectrum manager (204) for selecting or deselecting an operating frequency channel; and a geolocation module for determining the location of the device. The wireless device may further include a network interface (203) for accessing a TV band database and a geolocation database.

15 Claims, 5 Drawing Sheets

DYNAMIC RECONFIGURATION OF REGULATION-COMPLIANCE MODE IN COGNITIVE RADIO NETWORKS

This application claims the benefit of U.S. Provisional Application No. 61/231,388 filed on Aug. 5, 2009.

The invention generally relates to devices in a cognitive radio network, and more particularly, to a method and device for dynamically reconfiguring a regulation-compliance mode based on use of the device's incumbent protection mechanism capabilities.

In an effort to increase spectrum usage efficiency, wireless spectrum regulation has been increasingly changed towards allowing secondary users to dynamically access channels not being used by primary users. However, in allowing secondary users access to the wireless spectrum, regulatory bodies like the Federal Communications Commission (FCC) in US and Ofcom in UK, define a set of mechanisms to protect primary users from interference caused by the secondary users. Secondary users are required to employ the protection mechanisms, known as primary protection mechanisms, in order to operate in the regulated wireless spectrum of the primary users.

Depending on the primary protection mechanisms employed, a secondary user is classified into one of several regulation-compliance modes. Each primary protection mechanism or regulation-compliance mode has its own advantages and limitations when it comes to operation. For example, the cost (implementation and operating cost) and the degree of freedom to operate (in terms of network formation, channel selection, and transmission power limit) may vary. A device which employs a more complete set (or more tiers) of protection mechanisms normally enjoys a higher degree of freedom to initiate a network and select a channel and set a transmission power limit, at the expense of higher implementation cost.

The regulatory bodies classify the secondary users into several regulation-compliance modes depending on the primary protection mechanism employed. For example, the FCC defines three regulation-compliance modes for unlicensed personal/portable devices (secondary Television Band Devices, TVBD) to operate in the TV band, where TV stations and wireless microphones are incumbents (primary users). These 3 regulation-compliance modes are Mode II, Mode I, and sensing-only mode. In addition, the FCC also defines a fourth regulation-compliance mode device for high-power unlicensed TVBDs (as opposed to personal/portable TVBDs), namely a fixed device.

A device operating in Mode II is required to have the capability to determine its location with +/−50 m accuracy and access a TV band database in order to determine channel availability. Current rules also require Mode II devices to have an additional spectrum sensing capability. A Mode II device is allowed to initiate a network and set its transmit power limit to 100 mW. In contrast, a Mode I device is not required to have the geolocation capability or to access the TV band database, but is required to have sensing capability. However, Mode I devices cannot initiate a network and are only allowed to operate as a dependent device, enabled by a Mode II device (or a fixed device). A sensing-only device employs the sensing capability and is not required to have the geolocation capability or access to the TV band database. The sensing-only device can initiate a network and determine channel availability independently. However, the transmission power of the sensing-only device is limited to 50 mW. As another example, the spectrum regulator in the UK (Ofcom) allows two regulation-compliance mode devices: geolocation-only or sensing-only.

Each primary protection mechanism and hence, regulation-compliance mode, has advantages and limitations when it comes to operation. The geolocation-database approach (Mode II) relies on real-time geolocation and timely access to the Internet, which could be lost or not available at certain times and in certain locations, or could be very costly if a device relocates often. According to current FCC rules, if the location changes, a Mode II device needs to query the TV band database again. For the sensing approach, a quiet period during which all transmissions are suspended is needed, which costs spectrum usage efficiency. Sensing is also subject to false alarms by incorrectly treating noise as a primary signal. The sensing-only device is only allowed to transmit at a lower power limit than those supporting the geolocation database approaches.

Thus, as pointed out above, secondary devices are limited by regulatory compliance requirements. Restricting a secondary device to one regulation-compliance mode limits its operational flexibility and/or increases its operating cost, such as power consumption.

In accordance with one embodiment of the present invention, a method for dynamically reconfiguring the regulation-compliance mode of a secondary device based on the use of a set of primary protection mechanism is proposed. One of the advantages of the proposed method is that the operating cost of the secondary device may be lowered, and its degree of freedom to select channel and transmission power may be increased. As a result, a TVBD may have longer battery life, more channels to choose from, and/or higher link quality.

According to an exemplary embodiment of the invention, the disclosed features allow a secondary device:
  to identify the regulation-compliance mode of itself and other secondary devices and act accordingly to establish communication;
  to dynamically reconfigure its regulation-compliance mode to best suit the needs of network-operation. For example, a sensing and geolocation database combo device (e.g., Mode II TVBD) may turn off geolocation and TV band databases access to rely on sensing-only in order to improve its portability/mobility.
  to enable a dependent device through an enabling signal.

In one example embodiment of the invention, a method is provided for dynamically reconfiguring a regulation-compliance mode of a device that is part of a wireless network and is operating under a network-operation mode in a spectrum band with primary users. The method includes periodically determining at least one of: a primary protection capability of the device, availability of an enabling signal to the device, and a frequency of location change of the device; and based on the results of such determinations, operating and configuring transmission parameters of the device according to one of a plurality of regulation-compliance modes that are supported by the device based on its network-operation mode.

In another example embodiment of the invention, a device, being part of a wireless network, is provided for operating under a network-operation mode in a spectrum band with primary users. The wireless device includes: a signal transceiver for processing, transmitting and receiving wireless signals from secondary devices; a primary signal sensing module for detecting a primary signal; and a spectrum manager for selecting or deselecting an operating frequency channel. The wireless device may further include a network interface for accessing a TV-band database, and determining its geolocation.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
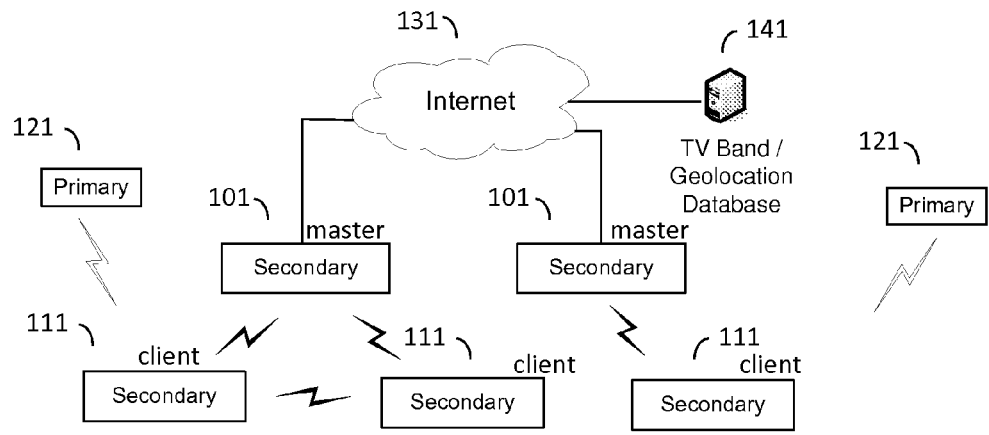
FIG. 1 illustrates a determination of spectrum availability by secondary devices in accordance with an embodiment of the present invention.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

As shown in FIG. 1, the spectrum availability in one example embodiment is determined by spectrum sensing and a TV band/Geolocation database. A secondary master device 101 can access a TV band/Geolocation database 141, for example, over the Internet 131 through a network interface. The TV band/Geolocation database 141 provides TV band information based on the geolocation of the secondary master device 101. Secondary master device 101 can also sense signals from a primary device 121.

For a secondary client device 111, the spectrum availability is normally determined by spectrum sensing of primary devices 121, as well as the signalling received from its associated secondary master device 101.

Figure 2:
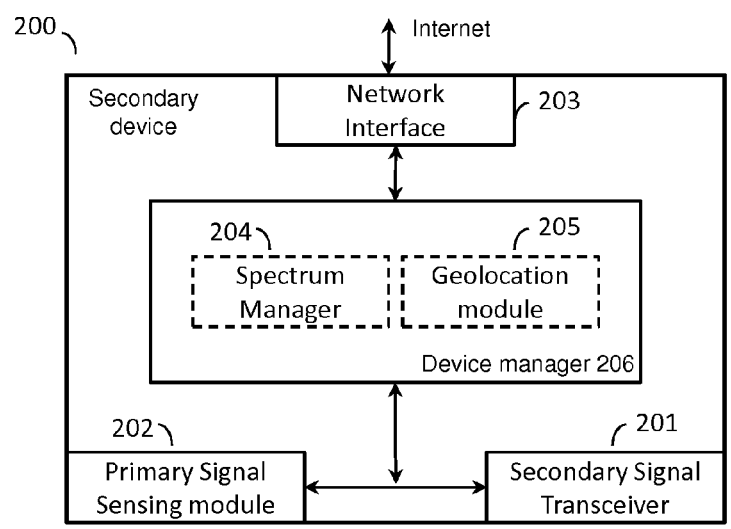
FIG. 2 illustrates a block diagram of a secondary device according to an embodiment of the invention.

FIG. 2 illustrates a block diagram of a secondary device. A secondary device 200 includes a secondary signal transceiver 201, a primary signal sensing module 202, a network interface 203, a spectrum manager 204 and a geolocation module 205. The secondary signal transceiver 201 is responsible for processing, transmitting, and receiving a wireless signal among secondary devices. The network interface 203 provides access to the TV band database and geolocation database, which can be remotely connected through, for example, the Internet. The primary signal sensing module 202 is responsible for detecting a primary signal. The spectrum manager 204 selects or deselects an operating frequency channel for the secondary devices based on the spectrum database and spectrum sensing. The geolocation module 205 determines the location of the device typically within +/−50 meters periodically or when location of the device changes. The spectrum manager 204 and geolocation module 205 may be component parts of a device manager 206 in the device.

The components, including the device manager 206 may be implemented as a hardware component (hardware circuit) which includes, for example, a field programmable gate array (FPGA), application specific integrated circuit (ASIC), gate array, combination of logical gates, signal processing circuit, analog circuit and the like. The components may include a software component as a part (fragment) for realizing the processing described above as software, and is not a concept which limits the language, the development environment and the like for realizing the software. The software component includes, for example, a task, process, thread, driver, firmware, database, table, function, procedure, subroutine, certain part of program code, data structure, array, variable, parameter and the like. Such a software component is realized on one or multiple memories (one or multiple special processors (for example, a specific CPU (Central Processing Unit), a DSP (Digital Signal Processor) and the like). Each of the embodiments described above does not limit the method of realizing each of the processing sections described above.

Figure 3:
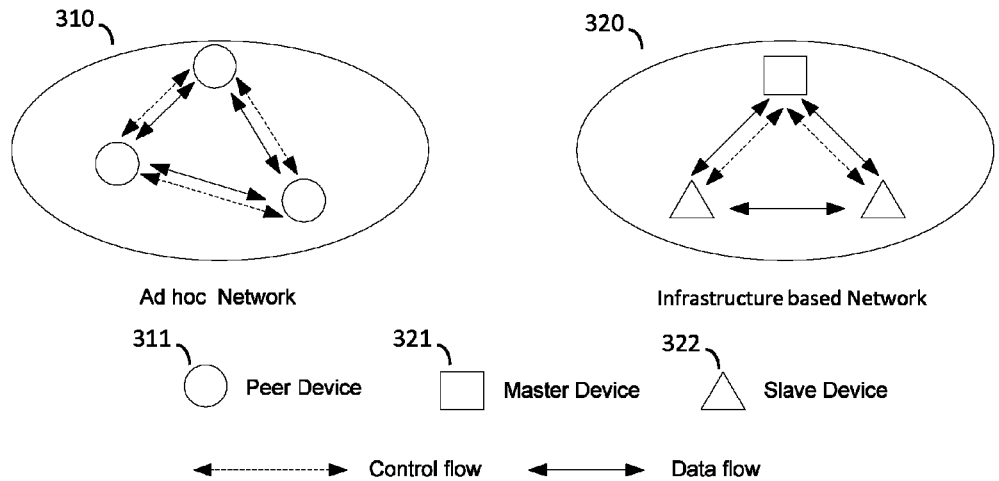
FIG. 3 illustrates a number of secondary devices forming a master-slave relationship or a peer-to-peer relationship.

As illustrated in FIG. 3, a network comprising a number of secondary devices may be formed as a peer-to-peer relationship (Ad-hoc network 310) or master-slave relationship (Infrastructure-based network 320). A secondary device may operate as a peer device 311, a master device 321, or a slave/client device 322.

Figure 4:
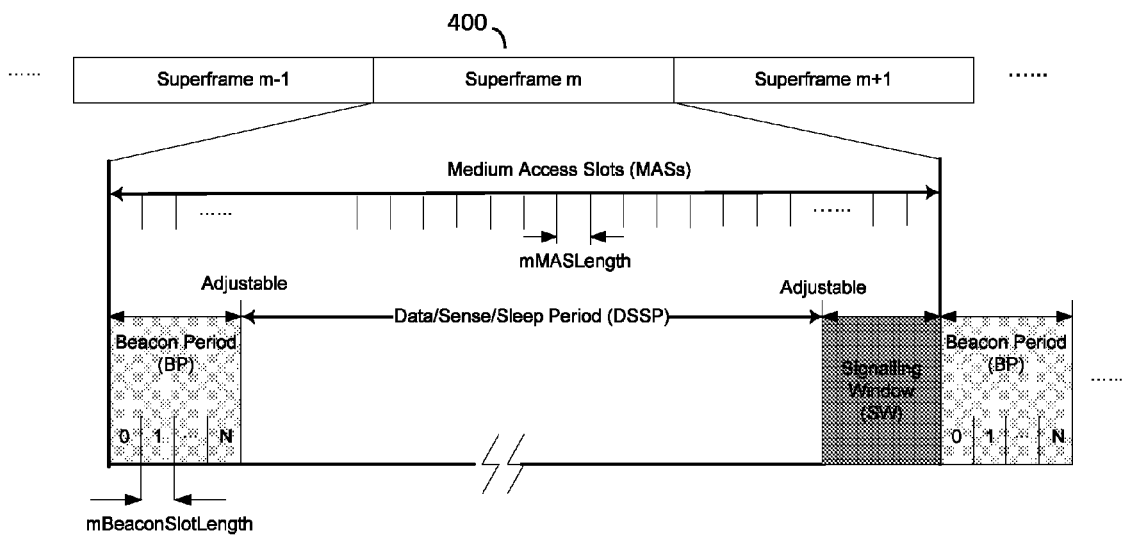
FIG. 4 illustrates a timing diagram of a beacon transmission in accordance with an exemplary embodiment.

In one example embodiment, at least one device transmits beacons periodically with the medium access control (MAC) superframe timing structure 400 as illustrated in FIG. 4.

Device Type and Regulation-Compliance Mode Identification

The device type is characterized by the selected network-operation mode and a regulation-compliance mode, as well as a security mode (optional). The network-operation mode indicates the network topology formation and the role of the device in the network. The network-operation mode can be a master, slave, or peer device.

The regulation-compliance mode is defined by regulation. In the FCC example discussed above, the regulation-compliance mode can be Mode II, Mode I, or sensing-only mode. In another example (Ofcom), the regulation-compliance mode can be geolocation-only or sensing-only.

In an example embodiment, if a device is a beaconing device, the device type should be incorporated in a beacon frame. A master device and a peer device are beaconing devices. A slave device can be a beaconing device depending on its capability. A beacon is transmitted periodically in the beacon period (BP), having a beacon frame payload format as illustrated in Table 1.

TABLE 1

Beacon frame payload format

| Syntax | Size | Notes |
| --- | --- | --- |
| Beacon_Frame_Payload_Format { | | |
| Device Identifier | 6 bytes | |
| Beacon Slot Descriptor | 1 byte | |
| Device type | 1 byte | |
| For(i=1, i<=N, i++){ | | |
|   IE$_i$ | variable | Information elements |
| } | | |
| } | | |

The information field coding of the device type is illustrated in Table 2 according to an example embodiment.

TABLE 2

Device Type

| Syntax | Size | Notes |
|---|---|---|
| Device_Type_Field_Format { | | |
| Network-operation mode | 2 bits | 00: peer (aka ad hoc) |
| | | 01: master |
| | | 10: slave w/beaconing promotion capability |
| | | 11: slave w/o beaconing promotion capability |
| Regulation-compliance mode | 2 bits | 00—Mode II (enabling device) portable |
| | | 01—Mode I (dependent device) portable |
| | | 10—Sensing only device |
| | | 11—reserved |
| Security mode | 2 bits | |
| Reserved | 2 bits | |
| } | | |

Enabling Dependent Device

A device operating in regulation-compliance mode (Mode II) can enable a dependent device which by itself cannot determine channel availability. To do that, the enabling device (Mode II device) needs to indicate a regulation-compliance mode and transmission power limit of the available channels for the dependent device to operate.

The enabling signal is defined as follows:

```
{
  -  regulatory-compliance mode (= Mode II)
  -  transmission power limit of a dependent device on current
     operating channel
  -  available outband channels and their transmission power limits
     (optional)
}
```

The transmission power limit is defined per channel. The inband transmission power limit is the transmission power limit of the current operating channel. The permissible outband channel is an available channel, other than the current operating channels. Permissible outband channels can be used for a backup channel. If the current operating channel becomes unavailable, one permissible outband channel can be selected as the new operating channel. The information elements of the inband transmission power limit and the permissible outband channel are illustrated in Table 3 and Table 4, respectively.

TABLE 3

Information Element of Inband Transmission Power Limit

| Syntax | Size | Notes |
|---|---|---|
| Power_Limit_Field_Format { | | |
| Element ID | 1 byte | |
| Length (=1) | 1 byte | |
| Transmission Power Limit of dependent device | 1 byte | In units of mW. The transmission power limit of a dependent device. |
| } | | |

TABLE 4

Information Element of Permissible Outband Channel

| Syntax | Size | Notes |
|---|---|---|
| Permissible_Outband_Channel_IE_Format { | | |
| Element ID | 1 byte | |
| Length (= 2+2xN) | 1 byte | |
| Regulatory domain | 1 byte | US, Canada, UK... |
| N | 1 byte | Num of Permissible Channels |
| For (i=0, i<N, i++){ | | |
| Channel number i | 1 byte | |
| Transmission power limit of channel i | 1 byte | Transmission power limit on channel i |
| } | | |
| } | | |

The enabling signal is transmitted periodically by the enabling device in its beacon. Once the enabling signal is received, a device can operate as a dependent device with respect to the enabling device. The dependent device needs to indicate its regulation-compliance mode and configure its own transmission parameter (the channel set and transmission limit) as indicated by the enabling device.

Regulation-Compliance Mode Reconfiguration

A master device may operate in either Mode II (or geolocation-only in the UK) or sensing-only mode. A slave device may operate in either Mode I or sensing-only mode. A peer device may operate in Mode II, Mode I, or sensing-only mode. The relationship between regulation-compliance mode and network-operation mode is illustrated in Table 5.

TABLE 5

Regulation-compliance mode vs. network-operation mode

| Regulation compliance mode | Network operation mode | | |
|---|---|---|---|
| | Master | Slave | Peer |
| Mode II | Support | N/A | Support |
| Mode I | N/A | Support | Support |
| Sensing only | Support | Support | Support |

Note that it is possible that some slave devices may have the capabilities to operate in Mode II.

The regulation-compliance mode can be changed from one to another based on the following inputs:

```
{
  (1) Primary protection capability: sensing function or geolocation
      database access function or dependent
  (2) Network-operation mode: Master/Slave/Peer
  (3) Location update frequency or moving speed
  (4) Availability of enabling signal.
}
```

Figure 5:
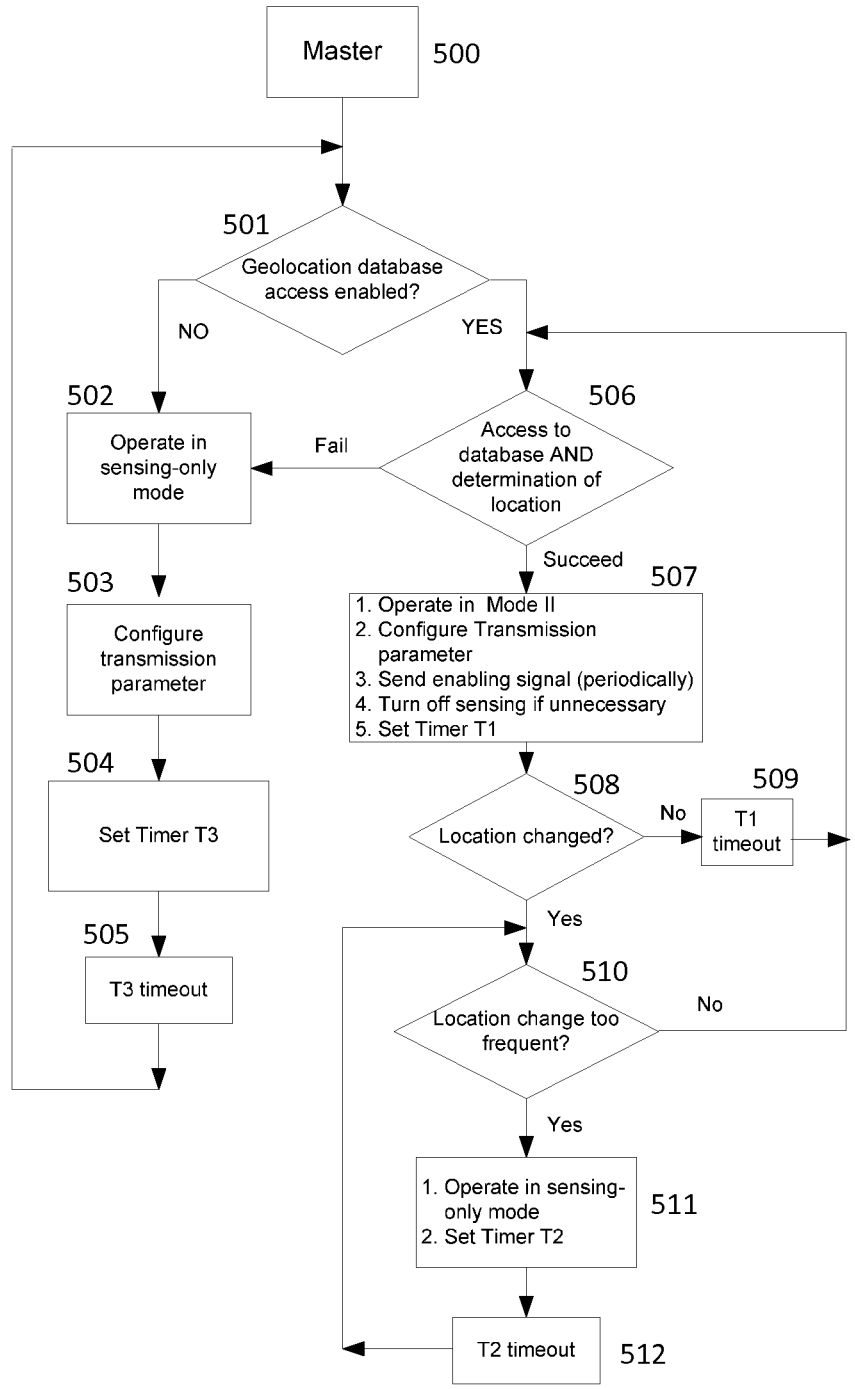
FIG. 5 illustrates a flow chart of dynamic reconfiguration of the regulation-compliance mode in a master device in accordance with an exemplary embodiment.
Figure 6:
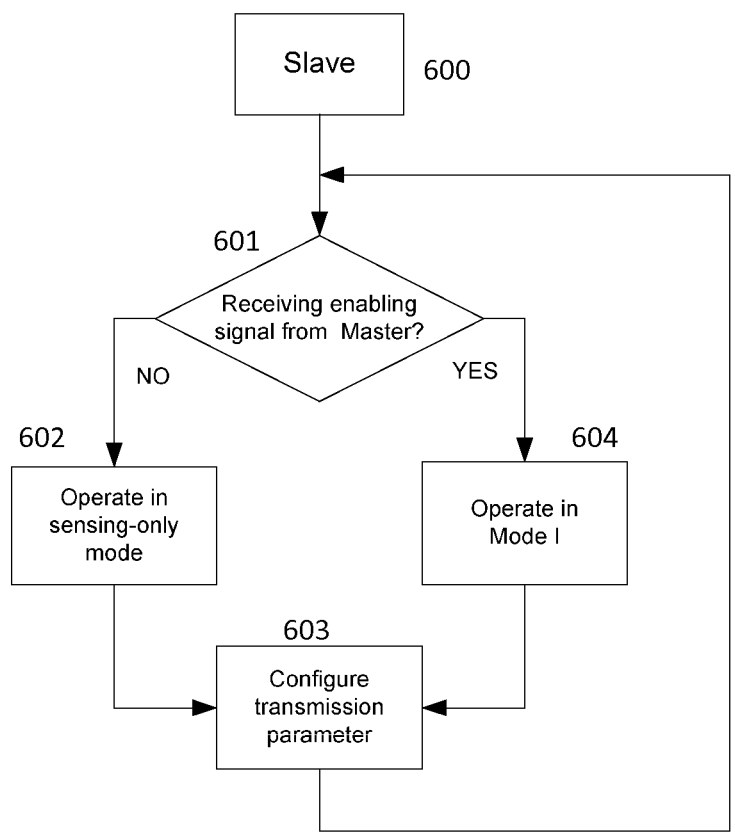
FIG. 6 illustrates a flow chart of dynamic reconfiguration of the regulation-compliance mode in a slave device in accordance with an exemplary embodiment.
Figure 7:
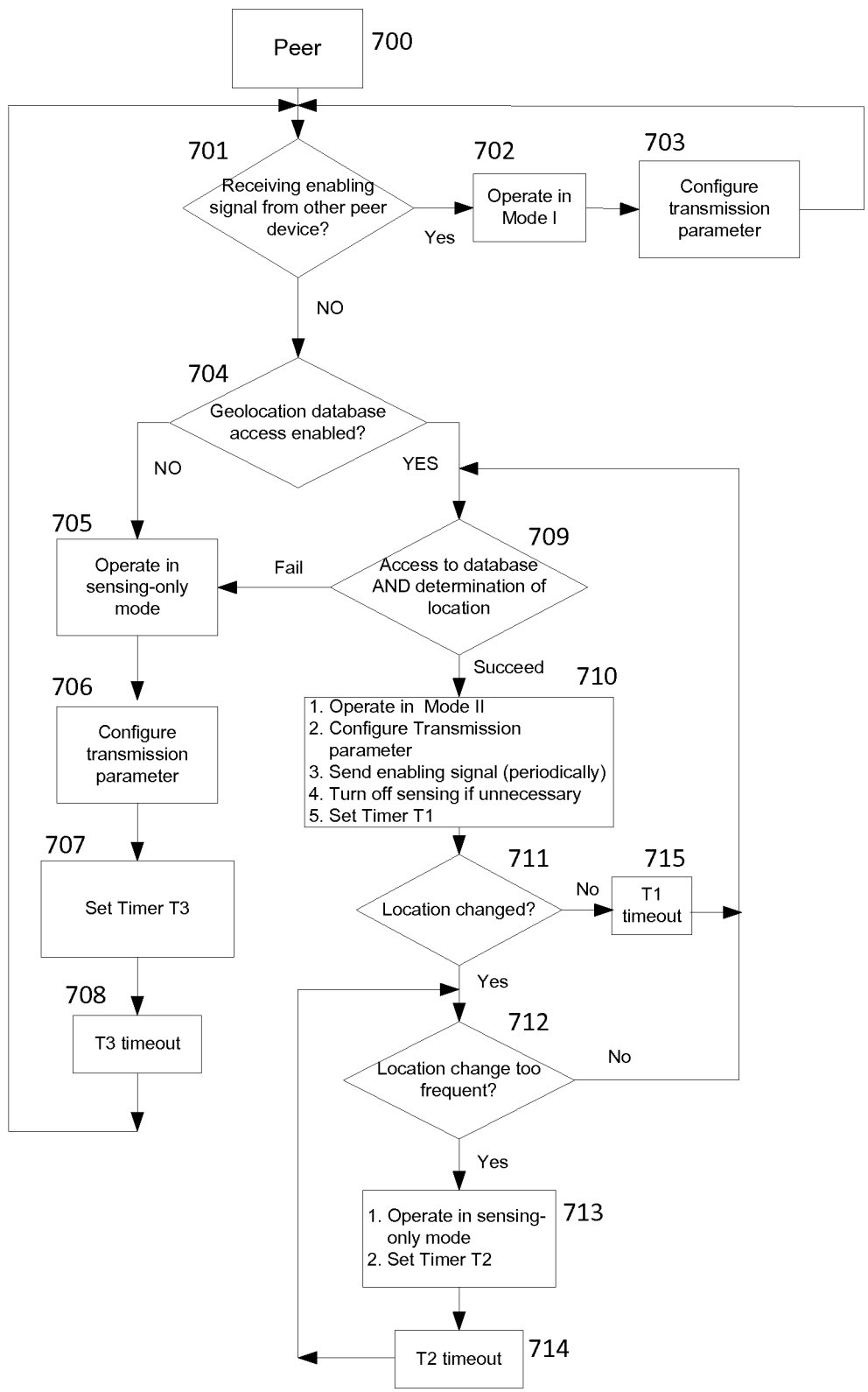
FIG. 7 illustrates a flow chart of dynamic reconfiguration of the regulation-compliance mode in a peer device in accordance with an exemplary embodiment.

The flowcharts of (re)configuration of the regulation-compliance mode are illustrated in FIG. 5, FIG. 6 and FIG. 7 for the secondary master device, slave device and peer device, respectively. It is noted that once the regulation-compliance mode is changed, the transmission parameter including channels to operate and transmission power limit should be updated accordingly. In one example, if a device changes its regulation-compliance mode from Mode II to sensing-only mode, the transmission power limit is changed from 100 mW to 50 mW as the regulation rules specify.

FIG. 5 illustrates the process flow for (re)configuring the regulation-compliance mode in a master device 500 according to an example embodiment. At 501, the master device determines whether access to a geolocation database is enabled. If not enabled, at 502, the master device operates in sensing-only mode; and at 503, configures its transmission parameters according to its current compliance mode. At 504, the master device sets a timer T3, and at 505, upon the expiration of the timer T3, it repeats the step 501 to determine whether access to a geolocation database is enabled. If access to a geolocation database is enabled, at 506, the master device determines its location and attempts to access the geolocation database. If such attempts fail for a period of time (maximum database check period set by regulatory rules), the master device performs step 502 to operate in sensing-only mode accordingly. If access to the database, as well as location determination are successful, at 507, the master device operates in Mode II, configures its transmission parameters according to its current compliance mode, periodically sends an enabling signal, turns off sensing if unnecessary, and sets a timer T1. At 508, the master device determines whether its location has changed; if not, at 509, upon the expiration of the timer T1, it returns to 506 to access the geolocation database and determine its location. If the location of the master device has changed, at 510, the master device determines whether the location change is too frequent, i.e., the frequency of change is over a threshold value. If the location change is too frequent, at 511, the master device operates in sensing-only mode and sets a timer T2. At 512, upon the expiration of the timer T2, the master device repeats operations in 510 to determine whether the location change is too frequent. If the location change is not too frequent, the mater device repeats operations in 506 to access the geolocation database and determine its location.

FIG. 6 illustrates the process flow for (re)configuring the regulation-compliance mode in a slave device 600 according to an example embodiment. At 601, the slave device determines whether it is receiving an enabling signal from a master device. If an enabling signal is not being received, at 602, the slave device operates in sensing-only mode, and at 603, configures its transmission parameters according to its current compliance mode. If an enabling signal is being received, at 604 the slave device operates in Mode I, and at 603 configures its transmission parameters according to its current compliance mode, and as specified by the master device in the enabling signal.

FIG. 7 illustrates the process flow for (re)configuring the regulation-compliance mode in a peer device 700 according to an example embodiment. At 701, the peer device determines whether it is receiving an enabling signal from another peer device. If yes, at 702 the peer device operates in Mode I, and at 703, configures its transmission parameters according to its current compliance mode. If an enabling signal is not being received, at 704, the peer device determines whether the access to a geolocation database is enabled. If not enabled, at 705, the peer device operates in sensing-only mode, and at 706, configures its transmission parameters according to its current compliance mode. At 707, the peer device sets a timer T3, and at 708, upon the expiration of the timer T3, it repeats operations in 701 to determine whether an enabling signal from another peer device is being received. If access to a geolocation database is enabled, at 709, the peer device attempts to access the geolocation database and determine its location. If such attempts fail for a period of time (maximum database check period set by regulatory rules), the peer device performs operations in 705 to operate in sensing-only mode accordingly. If access to the database, as well as location determination are successful, at 710, the peer device operates in Mode II, configures its transmission parameters according to its current compliance mode, periodically sends an enabling signal, turns off sensing if unnecessary, and sets a timer T1. At 711, the peer device determines whether its location has changed, if not at 715, upon the expiration of the timer T1, it repeats operations in 709 to access the geolocation database and determine its location. If the location of the peer device has changed, at 712, the peer device determines whether the location change is too frequent, i.e., the frequency of change is over a threshold value. If the location change is too frequent, at 713, the peer device operates in sensing-only mode and sets a timer T2. At 512, upon the expiration of the timer T2, the peer device repeats operations in 712 to determine whether the location change is too frequent. If the location change is not too frequent, the peer device repeats operations in 709 to access the geolocation database and determine its location.

The invention is applicable to, for example, IEEE 802.11, IEEE 802.15 and ECMA TC48-TG1, as well as other emerging cognitive radio standards.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. Computer readable storage media comprise all computer-readable media except for a transitory, propagating signal. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for dynamically reconfiguring a regulation-compliance mode of a device, the device belonging to a wireless network and operating under a network-operation mode in a spectrum band with primary users, the method comprising:
   determining primary user protection capability of the device; and
   periodically determining at least one of:
      availability of an enabling signal to the device, and
      frequency of location change of the device;
   based on the results of the periodic determination and the primary user protection capability of the device, operating and configuring transmission parameters of the device according to one of a plurality of regulation-compliance modes that are supported by the device;
wherein the enabling signal indicates a regulation-compliance mode and transmission power limit of available channels for the device to operate.

2. The method of claim 1, wherein the network-operation mode of the device is a master device, and the primary user protection capability of the device comprises access to a geolocation database, the method further comprising:
when the access to the geolocation database is disabled, operating and configuring transmission parameters of the device according to a sensing-only regulation-compliance mode;
when the access to the geolocation database is enabled, accessing the geolocation database and determining the location of the device;
when the access or location determination fails, operating and configuring transmission parameters of the device according to a sensing-only regulation-compliance mode; otherwise,
operating and configuring transmission parameters of the device according to a regulation-compliance Mode II, and sending an enabling signal; and
when the location of the device is changed and a frequency of the location change is over a threshold value, then operating and configuring transmission parameters of the device according to a sensing-only regulation-compliance mode.

3. The method of claim 2, further comprising turning off sensing when the device is operating in regulation-compliance mode geolocation-only.

4. The method of claim 1, wherein the network-operation mode of the device is a slave device, the method further comprising:
when an enabling signal is received, operating and configuring transmission parameters of the device according to a regulation-compliance Mode I and as specified in the enabling signal; otherwise, operating and configuring transmission parameters of the device according to a sensing-only regulation-compliance mode.

5. The method of claim 1, wherein the network-operation mode of the device is a peer device, and the primary user protection capability of the device comprises access to the geolocation database, the method further comprising:
when an enabling signal is received, operating and configuring transmission parameters of the device according to a regulation-compliance Mode I and as specified in the enabling signal;
when the access to the geolocation database is disabled, operating and configuring transmission parameters of the device according to a sensing-only regulation-compliance mode;
when the access to a geolocation database is enabled, accessing a geolocation database and determining the location of the device;
when the access or location determination fails, operating and configuring transmission parameters of the device according to a sensing-only regulation-compliance; otherwise, operating and configuring transmission parameters of the device according to a regulation-compliance Mode II, and sending an enabling signal; and
when the location of the device is changed and a frequency of the location change is over a threshold value, then operating and configuring transmission parameters of the device according to a sensing-only regulation-compliance mode.

6. The method of claim 1, wherein the periodic determinations are triggered by one or more timers.

7. The method of claim 1, further comprising incorporating a device type in a beacon frame and transmitting the beacon frame periodically in a beacon period of a medium access control (MAC) superframe timing structure, the device type being indicative of the network-operation mode and regulation-compliance mode of the device.

8. A device belonging to a wireless network and operating under a network-operation mode in a spectrum band with primary users, comprising:
a signal transceiver for processing, transmitting and receiving wireless signals from secondary devices;
a primary signal sensing module for detecting a primary signal;
a spectrum manager for selecting or deselecting an operating frequency channel; and
a geolocation module for determining the location of the device, wherein the device is configured to
determine primary user protection capability of the device; and
periodically determine at least one of:
availability of enabling signal to the device, and
frequency of location change of the device;
and based on the results of the periodic determinations and the primary user protection capability of the device, to operate and configure transmission parameters of the device according to one of a plurality of regulation-compliance modes that are supported by the network-operation mode of the device;
wherein the enabling signal indicates a regulation-compliance mode and transmission power limit of available channels for the device to operate.

9. The device of claim 8, wherein the network-operation mode of the device is a master device, and the primary user protection capability of the device further comprises a network interface for accessing a TV band database and a geolocation database, the device being further configured to:
when the access to a geolocation database is disabled, operate and configure transmission parameters of the device according to a sensing-only regulation-compliance mode;
when the access to a geolocation database is enabled, access a geolocation database and determine the location of the device,
when the access or location determination fails, operate and configure transmission parameters of the device according to a sensing-only regulation-compliance mode; otherwise, operate and configure transmission parameters of the device according to a regulation-compliance Mode II, and send an enabling signal; and
when the location of the device is changed and a frequency of location change is over a threshold value, then operate and configure transmission parameters of the device according to a sensing-only regulation-compliance mode.

10. The device of claim 9, being further configured to turn off sensing when the device is operating in the regulation-compliance mode geolocation-only.

11. The device of claim 8, wherein the network-operation mode of the device is a slave device, the device being further configured to:
when an enabling signal is received, operate and configure transmission parameters of the device according to a regulation-compliance Mode I and as specified in the enabling signal; otherwise, operate and configure transmission parameters of the device according to a sensing-only regulation-compliance mode.

12. The device of claim 8, wherein the network-operation mode of the device is a peer device, and the primary user protection capability of the device further comprises a network interface for accessing a TV band database and a geolocation database, the device is further configured to:
- when an enabling signal is received, operate and configure transmission parameters of the device according to a regulation-compliance Mode I and as specified in the enabling signal;
- when the access to a geolocation database is disabled, operate and configure transmission parameters of the device according to a sensing-only regulation-compliance mode;
- when the access to a geolocation database is enabled, access a geolocation database and determine the location of the device,
- when the access or location determination fails, operate and configure transmission parameters of the device according to a sensing-only regulation-compliance mode; otherwise, operate and configure transmission parameters of the device according to a regulation-compliance Mode II, and send an enabling signal; and
- when the location of the device is changed and a frequency of location change is over a threshold value, then operate and configure transmission parameters of the device according to a sensing-only regulation-compliance mode.

13. The device of claim 8, further comprising one or more timers for triggering the periodic determinations.

14. A non-transitory computer readable storage medium having stored thereon computer executable code when executed causing a device, belong to a wireless network and operating under a network-operation mode in a band spectrum with primary users, to perform a process of reconfiguring regulation-compliance mode of the device, the process comprising:
- determining primary user protection capability of the device; and
- periodically determining at least one of:
  - availability of enabling signal to the device, and
  - frequency of location change of the device;
- based on the results of the periodic determinations and the primary user protection capability of the device, operating and configuring transmission parameters of the device according to one of a plurality of regulation-compliance modes that are supported by the device;
- wherein the enabling signal indicates a regulation-compliance mode and transmission power limit of available channels for the device to operate.

15. The non-transitory computer readable storage medium of claim 14, wherein the network-operation mode of the device is a master device, and the primary user protection capability of the device comprises access to a geolocation database, the process further comprising:
- when the access to a geolocation database is disabled, operating and configuring transmission parameters of the device according to a sensing-only regulation-compliance mode;
- when the access to a geolocation database is enabled, accessing a geolocation database and determining the location of the device,
- when the access or location determination fails, operating and configuring transmission parameters of the device according to a sensing-only regulation-compliance mode; otherwise, operating and configuring transmission parameters of the device according to a regulation-compliance Mode II, and sending an enabling signal; and
- when the location of the device is changed and a frequency of location change is over a threshold value, then operating and configuring transmission parameters of the device according to a sensing-only regulation-compliance mode.

* * * * *